(12) United States Patent
Tang et al.

(10) Patent No.: US 12,469,265 B2
(45) Date of Patent: Nov. 11, 2025

(54) METHOD FOR NEURAL NETWORK ADAPTATION

(71) Applicant: FANUC CORPORATION, Yamanashi (JP)

(72) Inventors: Te Tang, Fremont, CA (US); Tetsuaki Kato, Fremont, CA (US)

(73) Assignee: FANUC CORPORATION, Yamanashi (JP)

( * ) Notice: Subject to any disclaimer, the term of this patent is extended or adjusted under 35 U.S.C. 154(b) by 369 days.

(21) Appl. No.: 18/161,305

(22) Filed: Jan. 30, 2023

(65) Prior Publication Data

US 2024/0257505 A1   Aug. 1, 2024

(51) Int. Cl.
| | |
|---|---|
| *G06V 10/776* | (2022.01) |
| *B25J 9/16* | (2006.01) |
| *G06V 10/26* | (2022.01) |
| *G06V 10/764* | (2022.01) |
| *G06V 10/77* | (2022.01) |
| *G06V 10/774* | (2022.01) |
| *G06V 10/82* | (2022.01) |

(52) U.S. Cl.
CPC .......... *G06V 10/776* (2022.01); *B25J 9/1697* (2013.01); *G06V 10/26* (2022.01); *G06V 10/764* (2022.01); *G06V 10/7715* (2022.01); *G06V 10/7747* (2022.01); *G06V 10/82* (2022.01); *G06V 2201/06* (2022.01)

(58) Field of Classification Search
CPC .... G06V 10/776; G06V 10/26; G06V 10/764; G06V 10/7715; G06V 10/7747; G06V 10/82; G06V 10/774; G06V 10/267; G06V 10/454; G06V 2201/06; B25J 9/1697; G06N 3/0464

See application file for complete search history.

(56) References Cited

U.S. PATENT DOCUMENTS

| | | | |
|---|---|---|---|
| 2018/0330238 A1* | 11/2018 | Luciw | G06N 3/08 |
| 2019/0102646 A1* | 4/2019 | Redmon | G06V 20/20 |
| 2020/0342586 A1* | 10/2020 | Kumar | G06T 7/136 |

(Continued)

FOREIGN PATENT DOCUMENTS

| | | | | |
|---|---|---|---|---|
| CN | 111402336 A | * | 7/2020 | G06T 7/215 |

OTHER PUBLICATIONS

Sinha et al, Auto-Associative Features with Non-Iterative Learning Based Technique for Image Classification, 2021, International Joint Conference on Neural Networks, pp. 1-7. (Year: 2021).*

*Primary Examiner* — Kathleen M Broughton
(74) *Attorney, Agent, or Firm* — John A. Miller; Shumaker, Loop & Kendrick, LLP

(57) ABSTRACT

A system and method for adapting a feature extraction neural network to only identify environment independent features in an image. The method includes modifying weights within a dataset classifier neural network to improve the accuracy of the ability of the dataset classifier neural network to identify that training features images are from training images and test features images are from test images. The method also includes modifying the weights within a feature extraction neural network to reduce the accuracy of the ability of the dataset classifier neural network to identify that the training features images are from the training images and the test features images are from the test images.

14 Claims, 4 Drawing Sheets

(56) References Cited

U.S. PATENT DOCUMENTS

| | | | |
|---|---|---|---|
| 2021/0097344 A1* | 4/2021 | Goldstein | G06V 30/2504 |
| 2021/0205995 A1* | 7/2021 | Vu | B25J 9/1666 |
| 2021/0248427 A1* | 8/2021 | Guo | G06V 10/82 |
| 2022/0072712 A1 | 3/2022 | Tang et al. | |
| 2022/0284703 A1* | 9/2022 | Lopez | G06V 10/22 |
| 2023/0267614 A1* | 8/2023 | Cherian | G06T 7/50 |
| | | | 700/259 |

* cited by examiner

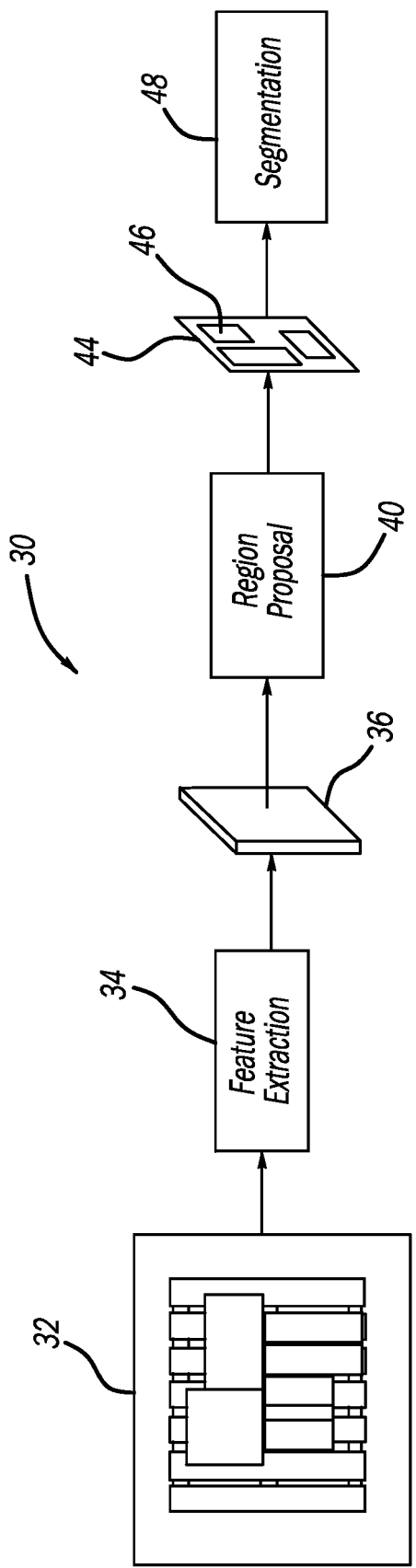
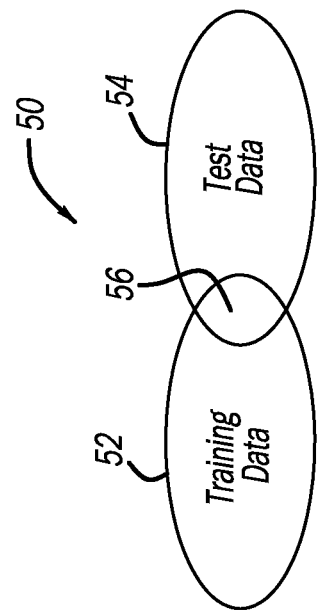
Fig. 2
Fig. 3

METHOD FOR NEURAL NETWORK ADAPTATION

BACKGROUND

Field

This disclosure relates generally to a system and method for adapting a feature extraction neural network to only identify environment independent features in an image and, more particularly, to a system and method for adapting a feature extraction neural network to only identify environment independent features in an image, where the feature extraction neural network is provided in an image segmentation system that identifies boxes to be picked up by a robot.

Discussion of the Related Art

Robots perform a multitude of commercial tasks including pick and place operations, where the robot picks up and moves objects from one location to another location. For example, the robot may pick up boxes off of a pallet and place the boxes on a conveyor belt, where the robot likely employs an end-effector with suction cups to hold the boxes. In order for the robot to effectively pick up a box, the robot needs to know the width, length and height of the box it is picking up, which is input into the robot controller prior to the pick and place operation. However, often times the boxes on the same pallet have different sizes, which makes it inefficient to input the size of the boxes into the robot during the pick and place operation. The boxes can also be placed side-by-side at the same height, where it is challenging to distinguish whether they are separate boxes or a single large box. Currently, no robot system is able to determine the size of a box it will pick up during real time.

US 2022/0072712 by Te Tang et al., titled Mix-Size Depalletizing, filed Sep. 9, 2020, assigned to the assignee of this application and herein incorporated by reference, discloses a system and method for identifying a box to be picked up by a robot from a stack of boxes. The method includes obtaining a 2D red-green-blue (RGB) color image of the boxes and a 2D depth map image of the boxes using a 3D camera, where pixels in the depth map image are assigned a value identifying the distance from the camera to the boxes. The method generates a segmentation image of the boxes by performing an image segmentation process that extracts features from the RGB image and the depth map image using a trained feature extraction neural network, combines the extracted features in the images and assigns a label to the pixels in a features image so that each box in the segmentation image has the same label. The method then identifies a location for picking up the box using the segmentation image.

The image segmentation process used in the '712 application employs deep learning technology. Deep learning is a particular type of machine learning that provides greater learning performance by representing a certain real-world environment as a hierarchy of increasing complex concepts. Deep learning typically employs a software structure comprising several layers of neural networks that perform non-linear processing, where each successive layer receives an output from the previous layer. Generally, the layers include an input layer that receives raw data from a sensor, a number of hidden layers that extract abstract features from the data, and an output layer that identifies a certain thing based on the feature extraction from the hidden layers. The neural networks include neurons or nodes that each has a "weight" that is multiplied by the input to the node to obtain a probability of whether something is correct. More specifically, each of the nodes has a weight that is a floating point number that is multiplied with the input to the node to generate an output for that node that is some proportion of the input. The weights are initially "trained" or set by causing the neural networks to analyze a set of known data under supervised processing and through minimizing a cost function to allow the network to obtain the highest probability of a correct output. Deep learning neural networks are often employed to provide image feature extraction and transformation for the visual detection and classification of objects in an image, where a video or stream of images can be analyzed by the network to identify and classify objects and learn through the process to better recognize the objects. Thus, in these types of networks, the system can use the same processing configuration to detect certain objects and classify them differently based on how the algorithm has learned to recognize the objects.

Once the feature extraction neural network of the type disclosed in the '712 application is trained it is ready to be used in a real world application, referred to herein as a deployment environment. For a specific deployment environment, the robotic system is tested using test images of specific objects that it will be identifying and picking up. However, the test images used during testing of the robots ability to identify the objects to be picked up in the deployment environment may be significantly different from the training images used during training of the neural networks in the robotic system, thus resulting in poor performance of the robotic system. For example, if the neural network is to be employed in a robotic system that picks up boxes off a pallet, it will have been trained using many training images of boxes positioned on a pallet where the size and location of the boxes in the images are known. When the robotic system is provided in a certain deployment environment, the boxes to be picked up may be very different in, for example, size, shape, texture, etc., than the boxes in the training images, and thus, the ability of the robotic system to identify the boxes for the deployment environment may not be satisfactory. Further, the deployment environment itself may be different than the training environment, where differences in, for example, lighting, reflection of light off of objects in the environment, shadows, camera view angle, background features, etc., may also reduce the ability of the robotic system to identify the test images.

SUMMARY

The following discussion discloses and describes a system and method for adapting a feature extraction neural network to only identify environment independent features in an image. The method includes training the feature extraction neural network using 2D RGB training images, generating training features images by providing the training images to the trained feature extraction neural network, providing the training features images to a dataset classifier neural network along with an identifier that the training features images are from the training images, observing how accurately the dataset classifier neural network identified that the training features images were from the training images, modifying weights within the dataset classifier neural network to improve the accuracy of the ability of the dataset classifier neural network to identify that the training features images were from the training images. The method also includes generating test features images by providing test images to the trained feature extraction neural network, where the test images include environment dependent features that are different than environment dependent features in the training images and environment independent features that are the same or similar to environment independent features in the training images, providing the test features images to the dataset classifier neural network along with an identifier that the test features images are from the test images, observing how accurately the dataset classifier neural network identified that the test features images were from the test images, and modifying the weights within the dataset classifier neural network to improve the accuracy of the ability of the dataset classifier neural network to identify that the test features images were from the test images. The method further includes again generating training features images by providing the training images to the trained feature extraction neural network, again providing the training features images to the dataset classifier neural network, but without the identifier that the training features images are from the training images, again observing how accurately the dataset classifier neural network identified that the training features images were from the training images, and modifying the weights within the feature extraction neural network to reduce the accuracy of the ability of the dataset classifier neural network to identify that the training features images were from the training images. The method also includes again generating test features images by providing the test images to the trained feature extraction neural network, again providing the test features images to the dataset classifier neural network, but without the identifier that the test features images are from the test images, again observing how accurately the dataset classifier neural network identified that the test features images were from the test images, and modifying the weights within the feature extraction neural network to reduce the accuracy of the ability of the dataset classifier neural network to identify that the test features images were from the test images.

Additional features of the disclosure will become apparent from the following description and appended claims, taken in conjunction with the accompanying drawings.

BRIEF DESCRIPTION OF THE DRAWINGS

FIG. 2 is a schematic block diagram of a neural network training dataset module;

FIG. 3 is an illustration of an overlap between training data and test data showing environment independent features;

DETAILED DESCRIPTION OF THE EMBODIMENTS

The following discussion of the embodiments of the disclosure directed to a system and method for adapting a feature extraction neural network to only identify environment independent features in an image is merely exemplary in nature, and is in no way intended to limit the disclosure or its applications or uses. For example, the system and method have application for training a neural network that will be used for identifying a box to be picked up by a robot. However, the system and method will have other applications.

Figure 1:
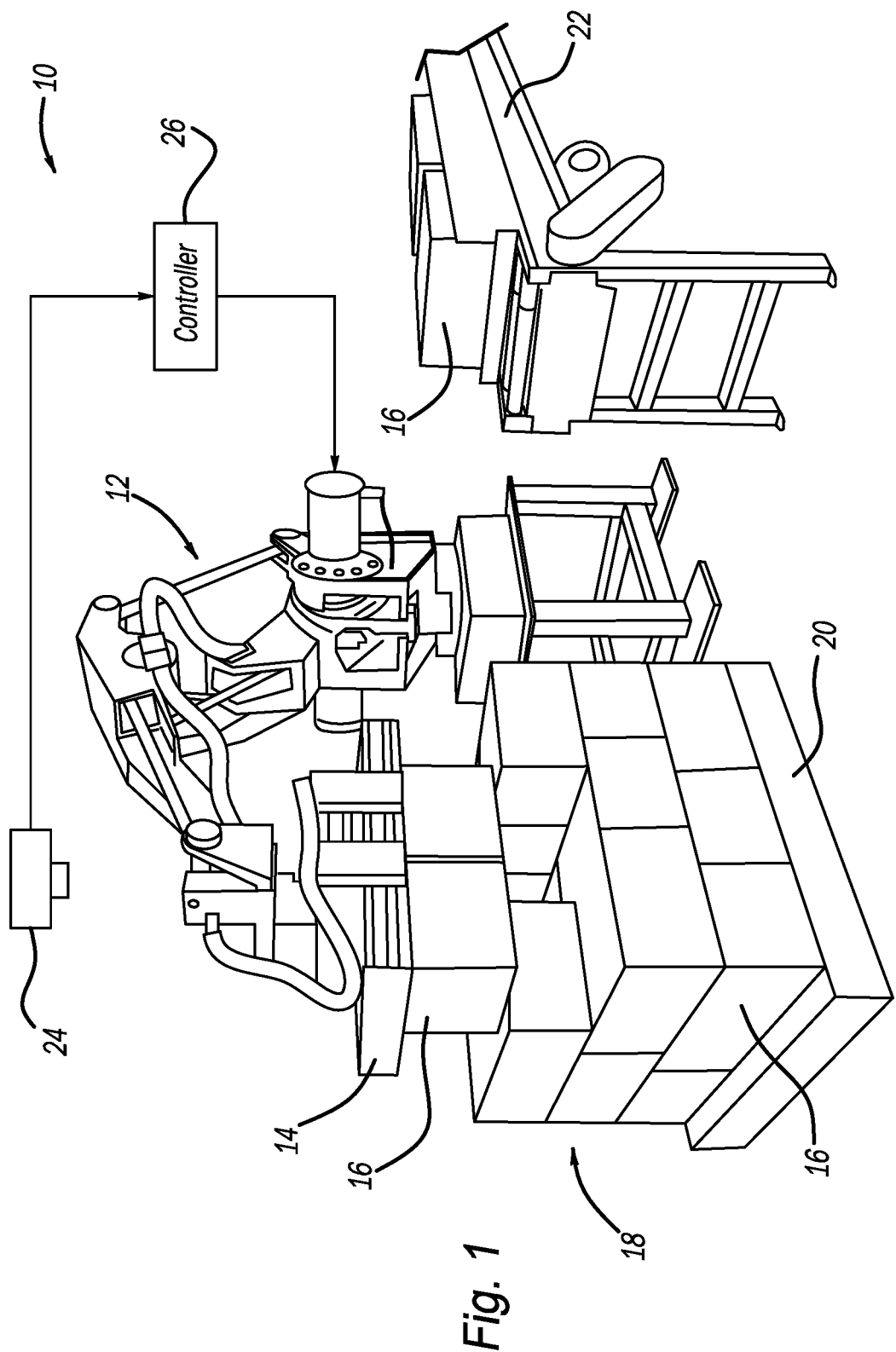
FIG. 1 is an illustration of a robot system including a robot picking up boxes off of a pallet and placing them on a conveyor belt.

FIG. 1 is an illustration of a robotic system 10 including a robot 12 having an end-effector 14 that is configured for picking up cardboard boxes 16 from a stack 18 of the boxes 16 positioned on a pallet 20 and placing them on a conveyor belt 22. The system 10 is intended to represent any type of robotic system that can benefit from the discussion herein, where the robot 12 can be any robot suitable for that purpose. A 3D camera 24 is positioned to take top down 2D RBG and depth map images of the stack 18 of the boxes 16 and provide them to a robot controller 26 that controls the movement of the robot 12. The boxes 16 may have different orientations on the pallet 20, may be stacked in multiple layers on the pallet 20 and may have different sizes.

FIG. 2 is a schematic block diagram of a neural network training dataset module 30 of the type disclosed in the '712 application for training a neural network that will perform image segmentation to allow the robot 12 to identify the boxes 16 to be picked up. Varying RGB training images 32 are provided to a neural network feature extraction module 34 that performs a filtering process that extracts features from the image 32. For example, the module 34 may include learned-based neural networks that extract gradients edges, contours, elementary shapes, etc. from the image 32, and provide an extracted features image 36 of the training image 32. The image 36 is provided to a region proposal module 40 that analyzes, using neural networks, the identified features in the training image 32 to determine the location of the boxes 16 in the image 36. Particularly, the module 40 includes neural networks providing a number of bounding boxes, such as 50 to 100 candidate boxes, of different sizes, i.e., boxes having various lengths and widths, that are used to identify the probability that a cardboard box 16 exists at a certain location in the image 36. The region proposal module 40 employs a sliding search window template, well known to those skilled in the art, where a search window including all of the bounding boxes is moved over the features image 36, for example, from a top left of the image 36 to a bottom right of the image 36, to look for features that identify the probable existence of one of the boxes 16.

The sliding window search produces a bounding box image 44 including a number of bounding boxes 46 that each surrounds a predicted box in the image 36. The module 40 parameterizes a center location (x, y), width (w) and height (h) of each box 46 and provides a prediction confidence value between 0% and 100% that a box 16 exists in the box 46. The image 44 is provided to a binary classification segmentation module 48 that estimates, using a neural network, whether a pixel belongs to the box 16 in each of the bounding boxes 46 to eliminate background pixels in the box 46 that are not part of the box 16. The remaining pixels in the image 44 in each of the boxes 46 are assigned a value for a particular box 16 so that a 2D segmentation image (not shown) is generated that identifies the boxes 16 by different indicia, such as color. The image segmentation process as described is a modified form of a deep learning mask R-CNN (convolutional neural network).

As discussed above, training of the weighted nodes in the image segmentation neural network using certain training images may not satisfactorily train the nodes to identify the boxes for a particular deployment environment. This is shown in FIG. 3 by illustration 50 including training data 52 that is used to train the neural network and test data 54 that is used to test the trained neural network for the particular deployment environment. For this example, the training and test data would include not only the size, shape, texture, etc. of the boxes, but also the lighting, reflection of light, shadows, camera view angle, background features, etc. of the environment. The illustration 50 shows that there is only some minimal overlap of the training data 52 and the test data 54 in an overlap region 56, thus resulting in poor performance of the robotic system 10 trained using the training data 52 for the deployment environment. For the discussion herein, the data features that fall within the region 56 are referred to herein as environment independent features and, for this example, may include the shape of the boxes 16, and the data features that fall outside of the region 56 are referred to herein as environment dependent features, and may include texture, lighting, reflection of light off objects in the environment, shadows, camera view angle, background features, etc. As will be discussed, this disclosure proposes identifying the environment independent features that should fall in the overlap region 56 between the training data 52 and the test data 54, and using only those features to further train the neural network in the feature extraction module 34 for the particular deployment environment.

Figure 4:
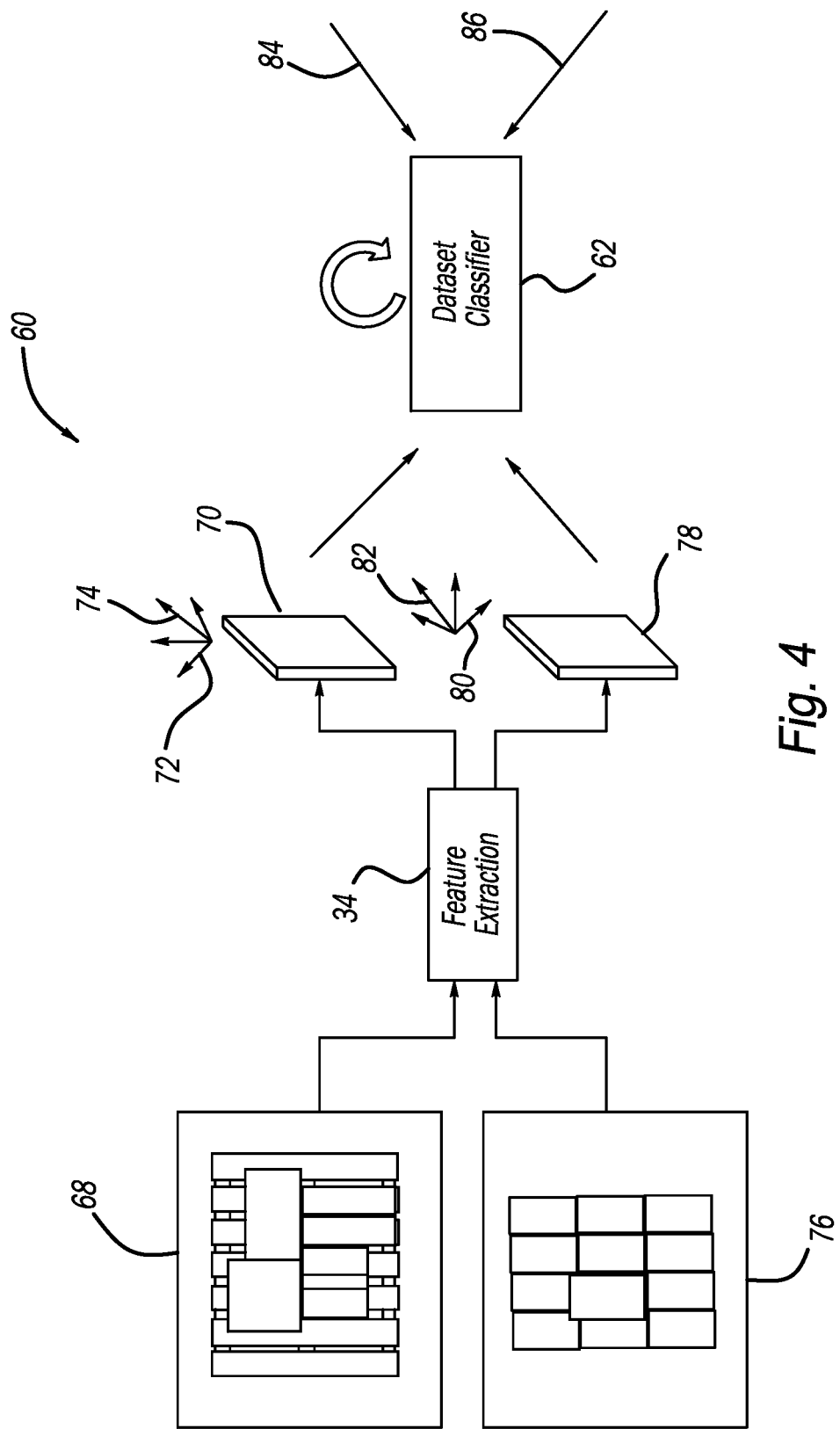
FIG. 4 is a schematic block diagram of a neural network dataset classifier module.

FIG. 4 is a schematic block diagram of a neural network dataset classifier system 60 that trains a dataset classifier convolutional neural network 62 for use in, for example, the segmentation module 36 that preforms an image segmentation process, such as disclosed in the '712 application, for a particular deployment environment, where like elements to the module 30 are identified by the same reference number. The system 60 includes the neural network feature extraction module 34 after it has been trained by the training images 32 as discussed above. The feature extraction module 34 again receives varying training images 68 that are the same or similar to the training images 32 to generate an extracted features image 70 of the training images 68 in the manner discussed above, where the image 70 includes various training image metrics defining the environment dependent features in the training images 68 identified by vectors 72 and various training image metrics defining the environment independent features in the training images 68 identified by vectors 74. The feature extraction module 34 also receives collected and varying test images 76 obtained from the deployment environment to generate an extracted features image 78 of the test images 76 in the manner discussed above, where the image 78 includes various test image metrics defining the environment dependent features in the test images 76 identified by vectors 80 and various test image metrics defining the environment independent features in the test images 76 identified by vectors 82. As shown, the vectors 72 and 80 are different, thus indicating that the environment dependent features in the training images 68 and the test images 76 are different, but the vectors 74 and 82 are the similar, thus indicating that the environment independent features in the training images 68 and the test images 76 are the same or similar.

The features images 70 and 78 are then used to train the dataset classifier neural network 62 for the deployment environment. The neural network 62 operates as a predictor of whether the extracted features in the image 70 or 78 are from a training image 68 or a test image 76. During the training phase of the classifier neural network 62, each time an extracted features image 70 from the training images 68 is provided to the neural network 62, the network 62 also receives a ground-truth label with the image 70 represented by line 84 that the image 68 currently being input to the module 34 is a training image 68. The neural network 62 provides an output that thus should indicate with certainty that the image being input to the module 34 is a training image 68. In this example, a 1 or 100% output from the neural network 62 indicates that the image is a training image 68. If the neural network 62 does not provide an output at or close to 100%, then the weights of the nodes in the network 62 are adjusted so that the network 62 provides a better indication that the image 70 is from a training image 68 for the next training image 68 that is input to the module 34. Likewise, each time an extracted features image 78 from the test images 76 is provided to the neural network 62, the network 62 also receives a ground-truth label with the image 78 represented by line 86 that the image 76 currently being input to the module 34 is a test image 76. The neural network 62 provides an output that thus should indicate with certainty that the image being input to the module 34 is a test image 76. In this example, a 0 or 0% output from the neural network 62 indicates that the image is a test image 76. If the neural network 62 does not provide an output at or close to 0%, then the weights of the nodes in the network 62 are adjusted so that the network 62 provides a better indication that the image 78 is from a test image 76 for the next test image 76 that is input to the module 34.

Figure 5:
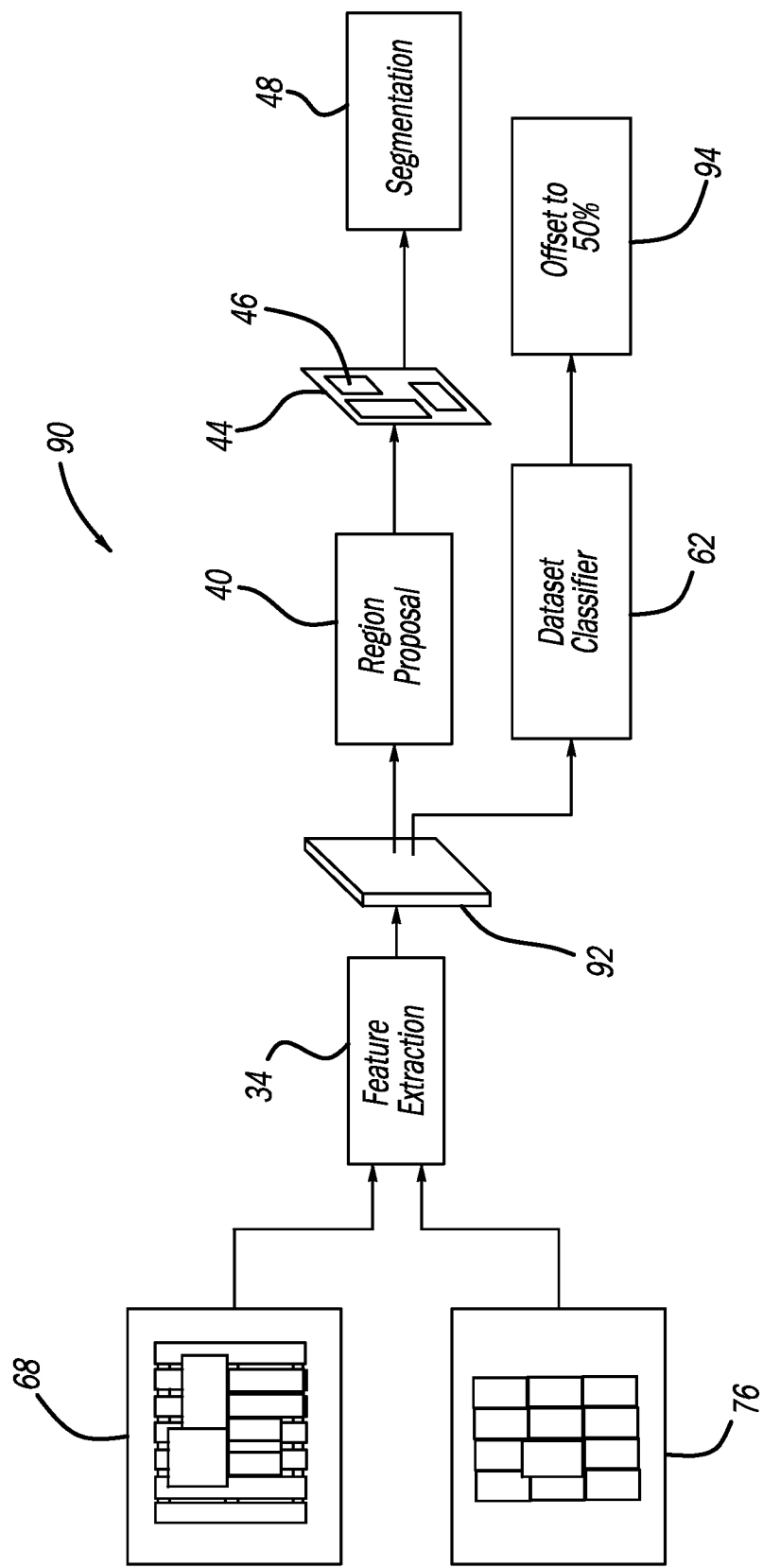
FIG. 5 is a schematic block diagram of a neural network feature extraction adaptation module.

FIG. 5 is a schematic block diagram of an adaptation system 90 that operates to adapt or train the feature extraction module 34 to provide only, or mostly only, environment independent features using the training images 68 and the test images 76 and the data classifier neural network 62 as it is being trained by the system 60, where like elements to the neural network training dataset module 30 are identified by the same reference number. Each time a training image 68 or a test image 76 is sent to the feature extraction module 34 and an extracted features image 92 is generated in the manner discussed above, the trained data classifier neural network 62 outputs a probability or prediction value that the features image 92 is from a training image 68 or a test image 76. If that probability value is at or near 50%, i.e., half-way between 100% indicating that the feature image 92 is generated from a training image 68 and 0% indicating that the features image 92 is generated from a test image 76, then it is known that the neural network 62 does not know whether the features image 92 is generated from a training image 68 or a test image 76, and therefore the features image 92 only or mostly includes environment independent features, while the environment dependent features are filtered out in the features image 92. When the neural network 62 outputs the probability value, a difference between that value and 50% is obtained as a cost function, which is then used to adjust the weights of the nodes in the feature extraction module 34 so the module 34 better outputs only environment independent features the next time. As the feature extraction module 34 is being updated, the region proposal module 40 and the classification segmentation module 48 are also being updated. Multiple iterations between training the neural network 62 and the feature extraction module 34 are performed in this manner to fully adapt the feature extraction module 34 so that its output will eventually be about 50%.

Various computers and controllers are described and implied above. It is to be understood that the software applications and modules of these computers and controllers are executed on one or more computing devices having a processor and a memory module that stores data and executable code. Also, as will be well understood by those skilled in the art, the several and various steps and processes discussed herein to describe the disclosure may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A system for adapting a feature extraction neural network, said system comprising:
   a computer including at least one processor and a memory device storing data and executable code that, when executed, causes the at least one processor to:
   train the feature extraction neural network using 2D red-green-blue (RGB) training images;
   generate training features images by providing the training images to the trained feature extraction neural network;
   provide the training features images to a dataset classifier neural network along with an identifier that the training features images are from the training images;
   observe how accurately the dataset classifier neural network identified that the training features images were from the training images;
   modify weights within the dataset classifier neural network to improve the accuracy of the ability of the dataset classifier neural network to identify that the training features images are from the training images;
   generate test features images by providing test images to the trained feature extraction neural network, said test images including environment dependent features that are different than environment dependent features in the training images and environment independent features that are the same or similar to environment independent features in the training images;
   provide the test features images to the dataset classifier neural network along with an identifier that the test features images are from the test images;
   observe how accurately the dataset classifier neural network identified that the test features images were from the test images; and
   modify the weights within the dataset classifier neural network to improve the accuracy of the ability of the dataset classifier neural network to identify that the test features images are from the test images;
   and where the at least one processor:
   again generates training features images by providing the training images to the trained feature extraction neural network;
   again provides the training features images to the dataset classifier neural network, but without the identifier that the training features images are from the training images;
   again observes how accurately the dataset classifier neural network identified that the training features images were from the training images;
   modifies the weights within the feature extraction neural network to reduce the accuracy of the ability of the dataset classifier neural network to identify that the training features images are from the training images;
   again generates test features images by providing the test images to the trained feature extraction neural network;
   again provides the test features images to the dataset classifier neural network, but without the identifier that the test features images are from the test images;
   again observes how accurately the dataset classifier neural network identified that the test features images were from the test images; and
   modifies the weights within the feature extraction neural network to reduce the accuracy of the ability of the dataset classifier neural network to identify that the test features images are from the test images;
   and wherein modifying the weights within the dataset classifier neural network and modifying the weights within the feature extraction neural network are repeated in an alternating sequence.

2. The system according to claim 1, wherein reducing the accuracy of the ability of the dataset classifier neural network to identify that the training features images were from the training images and the test features images were from the test images includes only providing environment independent features in the training features images and the test features images.

3. The system according to claim 1, wherein the feature extraction neural network is part of a neural network image segmentation system that generates segmentation images of objects.

4. The system according to claim 3, wherein the image segmentation system is part of a robot system having a robot that picks up the objects.

5. The system according to claim 4, wherein the objects are boxes positioned on a pallet.

6. The system according to claim 4, wherein the test images are provided from a deployment environment that the robotic system will be used in.

7. The system according to claim 1, wherein the feature extraction neural network and the dataset classifier neural network are deep learning Mask R-CNNs (convolutional neural network).

8. A method for adapting a feature extraction neural network, said method comprising:
   training the feature extraction neural network using 2D red-green-blue (RGB) training images;
   generating training features images by providing the training images to the trained feature extraction neural network;
   providing the training features images to a dataset classifier neural network along with an identifier that the training features images are from the training images;
   observing how accurately the dataset classifier neural network identified that the training features images were from the training images;
   modifying weights within the dataset classifier neural network to improve the accuracy of the ability of the dataset classifier neural network to identify that the training features images are from the training images;
   generating test features images by providing test images to the trained feature extraction neural network, said test images including environment dependent features that are different than environment dependent features in the training images and environment independent features that are the same or similar to environment independent features in the training images;
   providing the test features images to the dataset classifier neural network along with an identifier that the test features images are from the test images;

observing how accurately the dataset classifier neural network identified that the test features images were from the test images; and modifying the weights within the dataset classifier neural network to improve the accuracy of the ability of the dataset classifier neural network to identify that the test features images are from the test images;

again generating training features images by providing the training images to the trained feature extraction neural network;

again providing the training features images to the dataset classifier neural network, but without the identifier that the training features images are from the training images;

again observing how accurately the dataset classifier neural network identified that the training features images were from the training images;

modifying the weights within the feature extraction neural network to reduce the accuracy of the ability of the dataset classifier neural network to identify that the training features images are from the training images;

again generating test features images by providing the test images to the trained feature extraction neural network;

again providing the test features images to the dataset classifier neural network, but without the identifier that the test features images are from the test images;

again observing how accurately the dataset classifier neural network identified that the test features images were from the test images; and modifying the weights within the feature extraction neural network to reduce the accuracy of the ability of the dataset classifier neural network to identify that the test features images are from the test images;

wherein modifying the weights within the dataset classifier neural network and modifying the weights within the feature extraction neural network are repeated in an alternating sequence.

9. The method according to claim 8, wherein reducing the accuracy of the ability of the dataset classifier neural network to identify that the training features images were from the training images and the test features images were from the test images includes only providing environment independent features in the training features images and the test features images.

10. The method according to claim 8, wherein the feature extraction neural network is part of a neural network image segmentation system that generates segmentation images of objects.

11. The method according to claim 10, wherein the image segmentation system is part of a robot system having a robot that picks up the objects.

12. The method according to claim 11, wherein the objects are boxes positioned on a pallet.

13. The method according to claim 11, wherein the test images are provided from a deployment environment that the robotic system will be used in.

14. The method according to claim 8, wherein the feature extraction neural network and the dataset classifier neural network are deep learning Mask R-CNNs (convolutional neural network).

\* \* \* \* \*